United States Patent
Majewski et al.

(10) Patent No.: US 8,037,354 B2
(45) Date of Patent: Oct. 11, 2011

(54) APPARATUS AND METHOD FOR OPERATING A COMPUTING PLATFORM WITHOUT A BATTERY PACK

(75) Inventors: Joseph Steven Majewski, Strongsville, OH (US); Christopher Kikta, Pittsburgh, PA (US)

(73) Assignee: Honeywell International Inc., Morristown, NJ (US)

( * ) Notice: Subject to any disclaimer, the term of this patent is extended or adjusted under 35 U.S.C. 154(b) by 592 days.

(21) Appl. No.: 12/233,364

(22) Filed: Sep. 18, 2008

(65) Prior Publication Data

US 2010/0070782 A1    Mar. 18, 2010

(51) Int. Cl.
*G06F 1/26* (2006.01)
*G06F 1/30* (2006.01)
(52) U.S. Cl. .......................... 714/24; 713/320
(58) Field of Classification Search ............ 714/24; 713/320
See application file for complete search history.

(56) References Cited

U.S. PATENT DOCUMENTS

| | | | |
|---|---|---|---|
| 6,691,113 B1 * | 2/2004 | Harrison et al. | 1/1 |
| 6,832,120 B1 * | 12/2004 | Frank et al. | 700/65 |
| 7,069,540 B1 | 6/2006 | Sievert | |
| 2006/0139069 A1 * | 6/2006 | Frank et al. | 327/143 |

OTHER PUBLICATIONS

AX, "The cost to build device-to-enterprise solutions just went down . . . AXponentially," 8 pages, prior to Sep. 18, 2008.
Tridium, Niagara Architecture Overview, 5 pages, Copyright 2000-2007.
Tridium, Niagara Component Model, 2 pages, Copyright 2000-2007.
Tridium, "Vycon JACE-200," 2 pages, 2007.
Tridium, "Vycon JACE-600," 2 pages, 2007.

* cited by examiner

*Primary Examiner* — Thomas Lee
*Assistant Examiner* — Terrell Johnson
(74) *Attorney, Agent, or Firm* — Seager Tufte & Wickhem LLC

(57) ABSTRACT

An application control engine computing platform having a shut-down mechanism that permits the platform to adequately start up and operate upon return of power after a power interruption, without a need of a battery pack. The mechanism may target the saving of control object runtime values and operational settings of those objects, rather than the saving of the complete set of objects, and all unsaved alarm and history records upon a power interruption.

6 Claims, 7 Drawing Sheets

APPARATUS AND METHOD FOR OPERATING A COMPUTING PLATFORM WITHOUT A BATTERY PACK

BACKGROUND

The invention pertains to computing platforms and particularly to power interruptions to the platforms and their recovery.

SUMMARY

The present invention includes a mechanism that provides for operation of an application control engine computing platform without a battery pack. The computing platform may incur a power interruption and the mechanism can assure the previous operational state without the battery pack, so that upon return of power the computing platform can return to normal/continued operation without concerns.

DESCRIPTION

Figure 1:
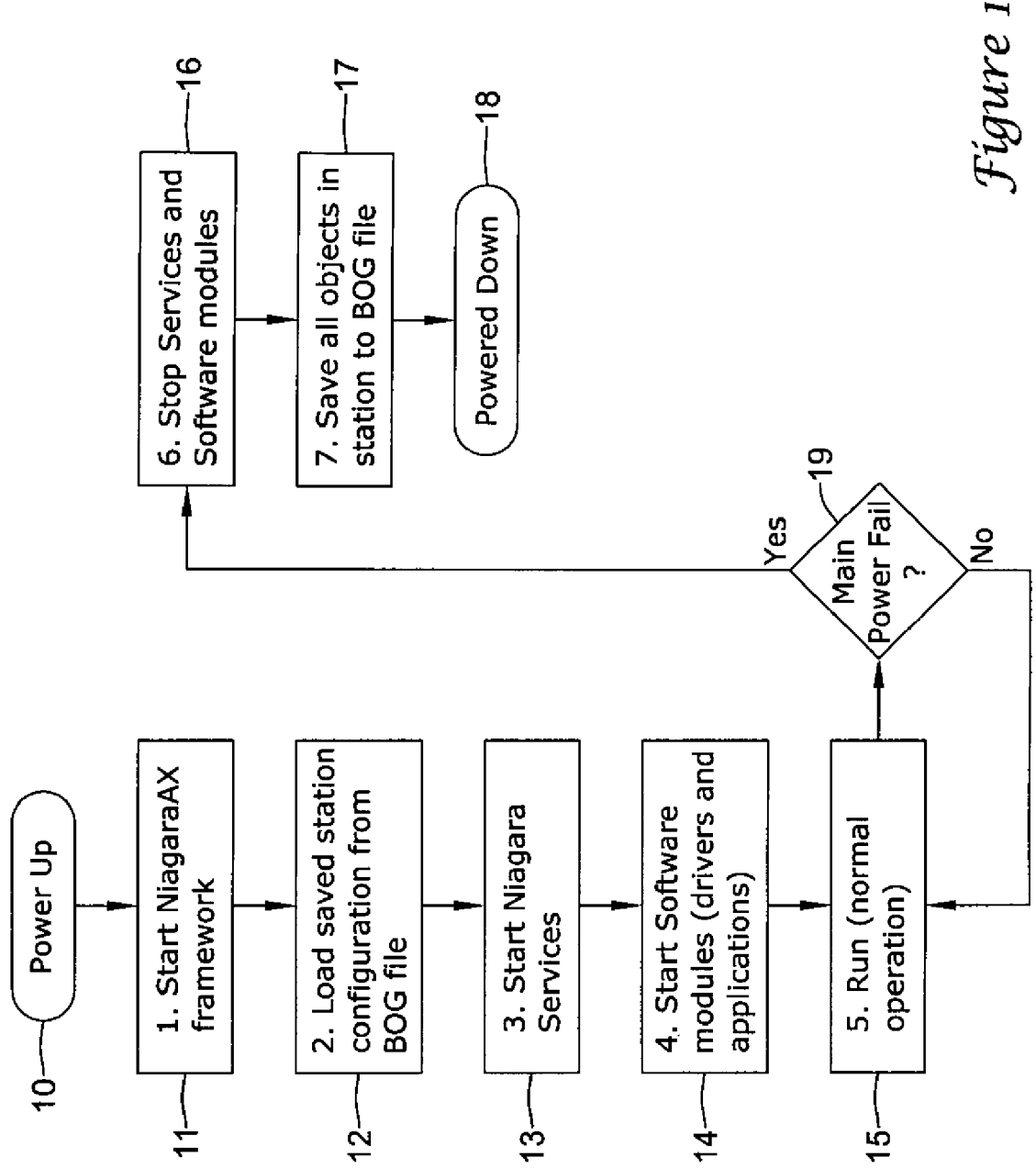
FIG. 1 is a diagram of a sequence of operations on a computer running a NiagaraAX™ framework.

The present invention is a mechanism which may allow the removal of the Tridium™ Java™ application control engine (JACE™) platform battery pack in selected deployments by providing an alternate way of storage persistence in case of a loss of power. Trademark terms herein are generally indicated just once with a superscript mark "™"; thus, the same terms without the marks should be regarded as trademarks. The invention may be regarded herein as the "present" system, mechanism, or the like.

The JACE™ is an embedded computing platform designed and manufactured by Tridium, Inc. It may be regarded as a dedicated computing platform. A key feature of the JACE platform is its ability to shut down gracefully in the event of a power loss. When power is lost, the JACE platform saves the entire state of the running "station" including Java objects in the station, the current runtime values of control objects, unsaved alarm records, unsaved history records and the operational parameters for the Java objects. When power is restored to the JACE, it reconstitutes the information saved at the time of power interruption thus restoring the JACE to its last known good running state. The largest portion of the saved information is collection of objects and their associated runtime and setting values. The JACE encodes this information into an XML-formatted object graph representing the entire object space of the station. The encoded information is stored in the JACE's persistent flash file system in a file referred to as a building automation Java architecture (BAJA) object graph (BOG). This usual sort of shutdown with the noted extent of saving information of the platform requires significant power after a power loss to the platform.

The main software program in control of the JACE is the NiagaraAX Framework™. NiagaraAX™ is a Java application. Due to the non-determinism and relatively slow performance of Java, the operation of saving a station's state to a BOG in persistent storage may take on the order of several minutes to accomplish. The power supply circuitry on many embedded computing platforms including the JACE provide capacitors that filter the rectified power supply input and supply some limited measure of stored charge after line voltage has been removed. This is typically on the order of less than 50 milliseconds and often less than 30 milliseconds. The JACE platform therefore uses a battery pack to act as an emergency shutdown power supply. The battery can supply power long enough to allow for complete encoding and storage of the BOG to the persistent file system.

Usage of a battery pack with the JACE platform presents a number of problems including battery lifespan, environmental concerns, and added weight and cost of the battery pack. It is desirable therefore to allow operation of the JACE platform without the battery pack.

The usual shutdown sequence of the JACE involves saving the complete set of Java objects and unsaved alarm and history records. The present system addresses one of the important subcomponents of this sequence which includes the saving of the last known runtime values of control objects and operation parameters for the control objects. The system is not intended to accomplish the same exact steps as the usual JACE shutdown sequence, but rather to provide a mitigation of the highest risk areas. If a station loses and regains power and its control objects' runtime values are set to invalid values, improper operation of the control application may result. Outputs that are controlling external equipment may thus be set to incorrect values resulting in unintended negative consequences. The present system therefore targets the saving runtime values of control objects and operational settings and/or parameters of those objects.

The present system in its first version is a set of NiagaraAX Java objects derived from the NiagaraAX BComponent™ Java class. These objects, referred to herein as "persist objects" allow persistence of the primitive Niagara data types used in control objects such as BStatusNumeric™, BBoolean™ and BEnum™. Upon initial creation, each persist object constructs a small data file in the persistent file system of the JACE. The filename is derived from an object reference designator (ORD) given to the persist object by the Niagara AX Framework. This is an alphanumeric string. The file is stored in the station's persistent file area in a designated directory. The file content is the binary representation of either a Java double, Java Boolean or Java Integer data type depending on the persist object type. The persist object provides Java methods for both reading from and writing to its own persistence file.

Control logic on JACE platforms is accomplished with Niagara wiresheets. "Wiresheets" are a graphical means of connecting BComponent-derived Niagara objects with Niagara "link" objects. BComponent objects expose their inputs and outputs via a Niagara Java construct called "slots". The output slots of top-level components in wiresheets drive the input slots of succeeding objects. The topmost components in a Niagara wiresheet are often field device inputs and the bottommost components are often field device outputs.

To enable the persistence of a control object, the input slot of the persist object of the appropriate type is attached to the output slot or slots of the desired control object. The output slot of the persist object is then attached to the input slot of the original intended target object. Persist objects are to be connected between the object whose runtime value is to be preserved and the next downstream target of the output value.

A second version of the present system will provide for automatic attachments of persist objects to existing wiresheets. The first version of the system requires attachment of a persist object to control objects manually with the Niagara wiresheet tool. Determination of a location to attach persist object may be automated by using Niagara's BAJA query language (BQL) mechanism to find all of the top-most control components and attaching persist objects between them and their next downstream components.

The Niagara BComponent-derived objects provide a Java method named "changed ( )". "changed ( )" is a so-called callback method. The NiagaraAX framework invokes this "changed( )" callback on BComponent-derived objects when the value of the object has been altered by external action. Included in the triggering external actions is the change of value of a slot. The persist objects are connected to the output value slots of control objects. When these values change, the "changed ( )" callback is invoked. The very first invocation of "changed ( )" is when the wiresheet is first instantiated by the framework and is entering its first control pass. Persist objects use the "changed ( )" callback to determine when to write the current value to persistent storage and when to read the persisted value back into the object.

On the first invocation of "changed ( )", a persist object attempts to read the previously saved value of the object from its persistence file. A default value is used if it has not been previously saved. If a persisted value is retrieved, the persist object's output slot's value is set to the persisted value, thus restoring its last known runtime state before use of the value by the next downstream control object. The restoration of the runtime value overrides the value loaded by NiagaraAX from its normal shutdown/restore sequence because it occurs almost immediately after that sequence has restored the value but before the value is used by a downstream object.

Subsequent invocations of "changed ( )" occur because the persist object's parent object's output value has been updated, and therefore trigger the persist object to save the current value to persistent storage. Values are persisted virtually immediately when changed. To avoid undue stress on the flash filesystem of the JACE, the persist object has several mitigation schemes. One is that values are checked to ensure that they differ since the last write to avoid persisting the same value multiple times. Another is that a configurable time-based anti-thrash algorithm is provided to limit the number of writes in a specified time period. Still another is that a configurable range-based anti-thrash algorithm is provided such that values may be written only if they have changed by more than a specified increment.

An important difference between the present system and the previous JACE shutdown sequences is that the present system accomplishes the saving of runtime state of objects immediately when it changes rather than waiting for a power failure. The problem space is reduced from an "order of N" problem to an "order of 1" problem where N is the number of Java objects. To ensure that runtime values are captured in the event of a power failure, the present version must ensure that the time to persist a single object's value is less than the amount of runtime provided by the JACE's power supply capacitors. The system's persistence time has been measured on a JACE platform and is between 5 and 9 milliseconds, and may almost always be less than 20 milliseconds. The capacitors used on the power supply of a JACE are capable of providing approximately 20-30 milliseconds of continued runtime in the event of power failure.

FIG. 1 is a diagram of a simplified sequence of operations on a JACE computer running a Tridium NiagaraAX™ framework. The computer may be powered up at symbol 10. Then the NiagaraAX framework may be started at step 11. At step 12, a saved station configuration may be loaded from a BOG file. The Niagara services may be started at step 13. The software modules (drivers and applications) may be started at step 14. The services and modules may be run (normal operation) at step 15. At symbol 19, a question may arise as to whether the main power has failed. If not, the services and modules will continue to run normally at step 15. If the main power does fail, then at step 16 the services and software modules are stopped, and at step 17, all of the objects in the station may be saved to the BOG file. Then the JACE is powered down. The steps beyond step 15 require the JACE computer to have battery power because steps 16 and 17 may require several minutes to complete. The present invention allows selected objects in a JACE computer to be stored and/or loaded without a battery by providing an alternate means of accomplishing step 17.

Figure 2:
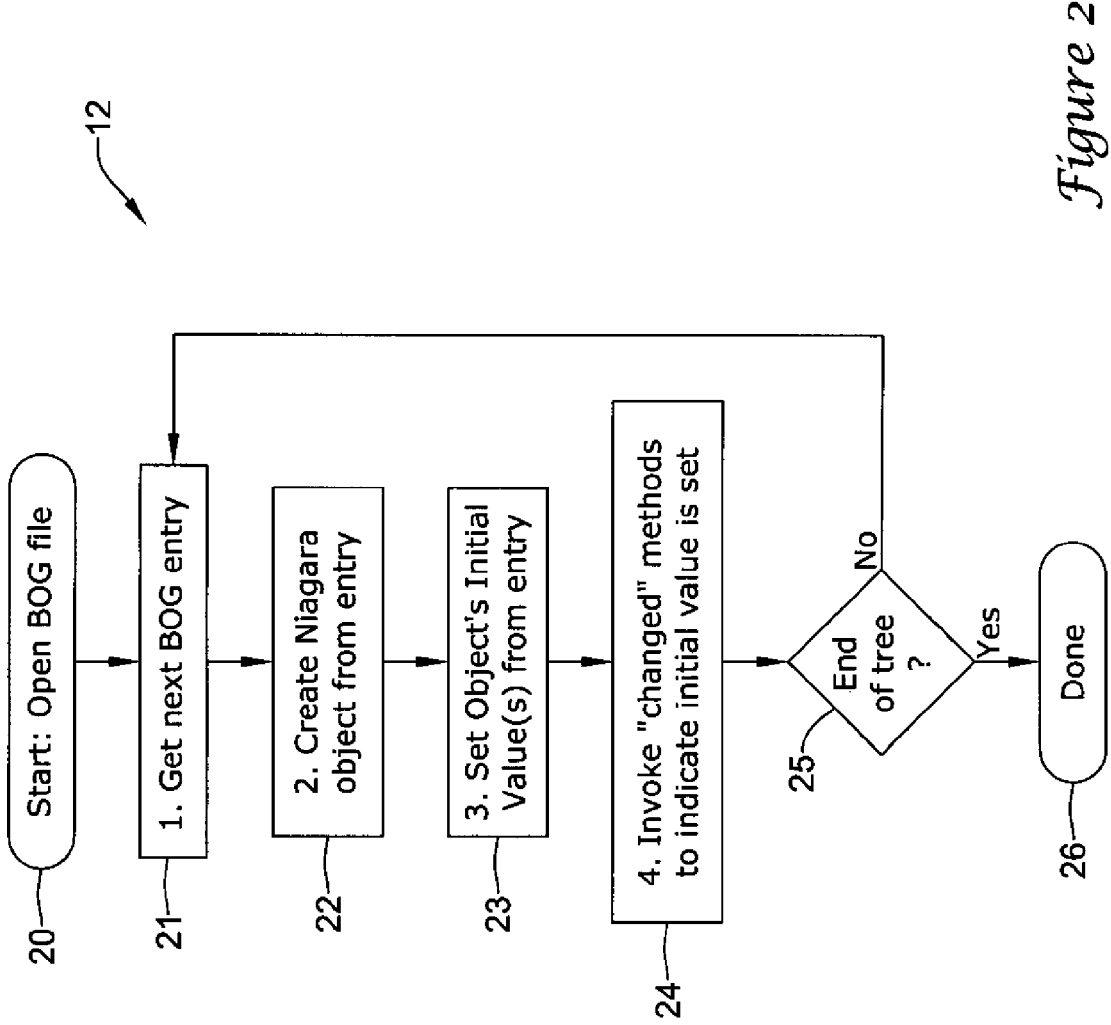
FIG. 2 is a diagram of an expansion of a load saved configuration from a BAJA object graph file process in FIG. 1.

FIG. 2 is an expansion of step 12 which is the "load saved station configuration from BOG file" process in FIG. 1. To start, the BOG file may be opened at symbol 20. Then at step 21, a BOG entry may be retrieved. A Niagara object may be created from the BOG entry at step 22. The object's initial value(s) may be set from entry at step 23. At step 24, "changed ( )" callbacks may be invoked to indicate that the initial value is set. At symbol 25, the question "End of the tree?" may be asked. If the answer is no, then proceed through steps 21 through 25 for the next BOG entry. The question at symbol 25 may be continuously asked again and steps 21 through 25 repeated until the answer to the question at symbol 25 is yes. Then, symbol 26 indicating "Done" may be reached.

Figure 3:
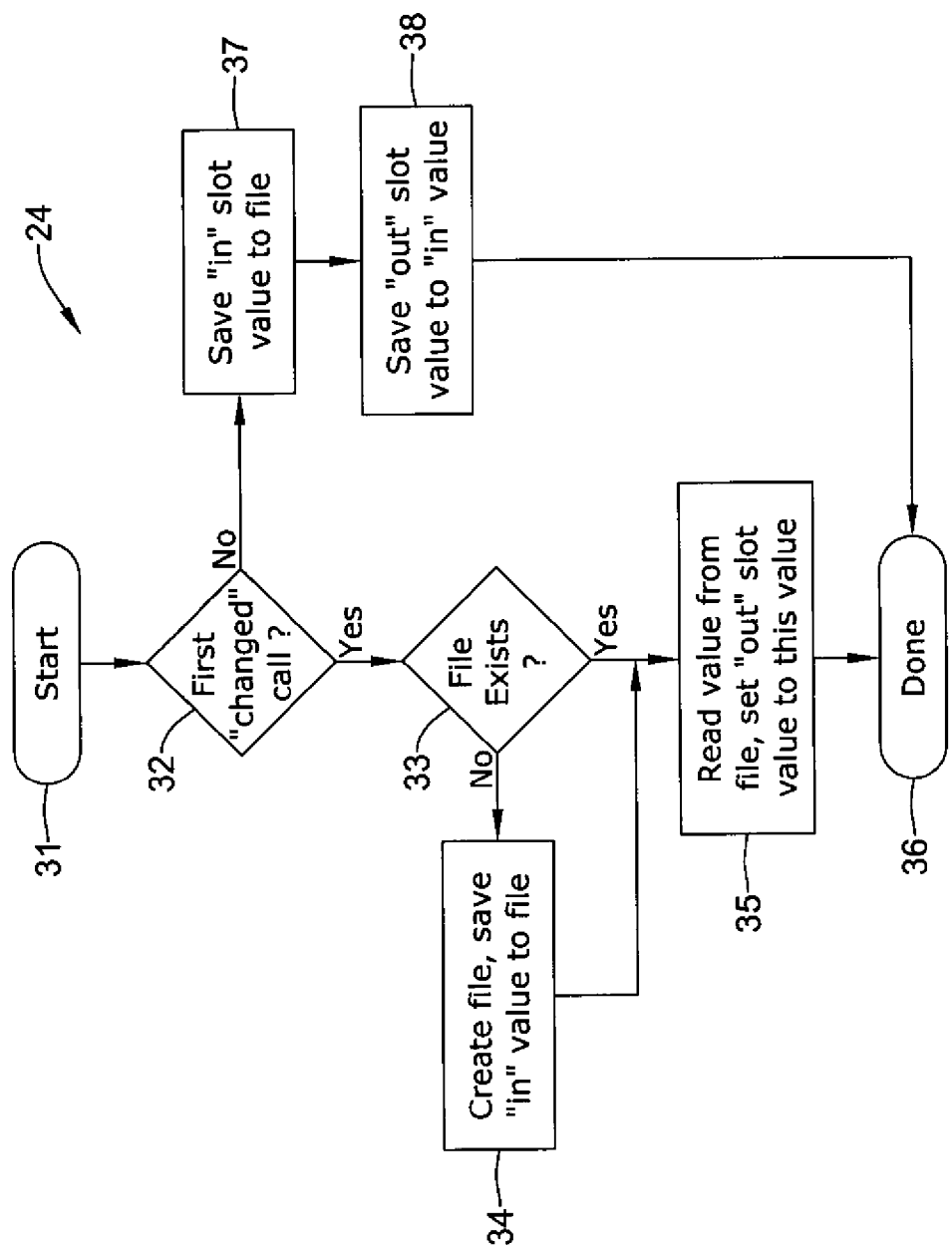
FIG. 3 is a diagram of a "changed ( )" callback operation used by the present computing platform.

FIG. 3 is a diagram of an operation of the invention using the "changed ( )" callback from NiagaraAX. The first "changed ( )" callback occurs in the diagram of FIG. 2 at step 24 nearly immediately after the object is instantiated by NiagaraAX and gets its initial value from the BOG file. Subsequent "changed ( )" callbacks are due to changes of value on the object. Since the object is linked to a parent object, it in effect saves/loads the parent object's value.

The flow diagram in FIG. 3 may start at symbol 31. The following symbol 32 has a question "First 'changed ( )' call?" If the answer is yes, then a symbol 33 asks a question whether "File exists?" If the answer is no, then at block 34 the file may be created and saved "in" value to the file. Next, one may go to block 35 which indicates "Read value from file, set 'out' slot value to this value." Then one may proceed to the "Done" symbol 36.

If the answer to the question, "File exists?" at symbol 33 is yes, then one goes to block 35 which indicates "Read value from file, set 'out' slot value to this value." Then one may proceed to the symbol 36 indicating "Done."

If the answer to the question "First 'changed ( )' call?" in symbol 32 is no, then save "in" slot value to file at block 37. Following block 37, an "out" slot value may be set to the "in" value at block 38. Then one may proceed to symbol 36 indicating "Done".

Figure 4:
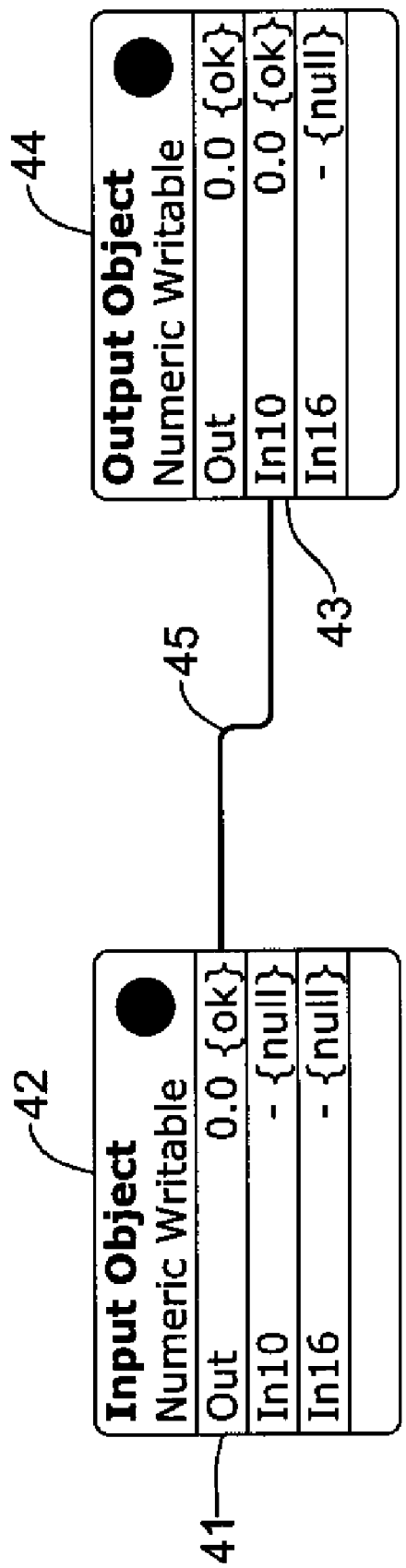
FIG. 4 is a diagram of a control sequence relative to an input object and an output object without the present system.

FIG. 4 is diagram showing a simple control sequence using NiagaraAX without the invention. Data comes from an "Out" slot 41 in an Input Object 42 to "In 10" slot 43 of an Output Object 44, via line 45. When "Out" changes value, Niagara sets "In 10" value and then invokes the "changed ( )" callback of Output Object 44 indicating a change of value to "In 10". Input and output objects 42 and 44 may be numeric writable.

Figure 5:
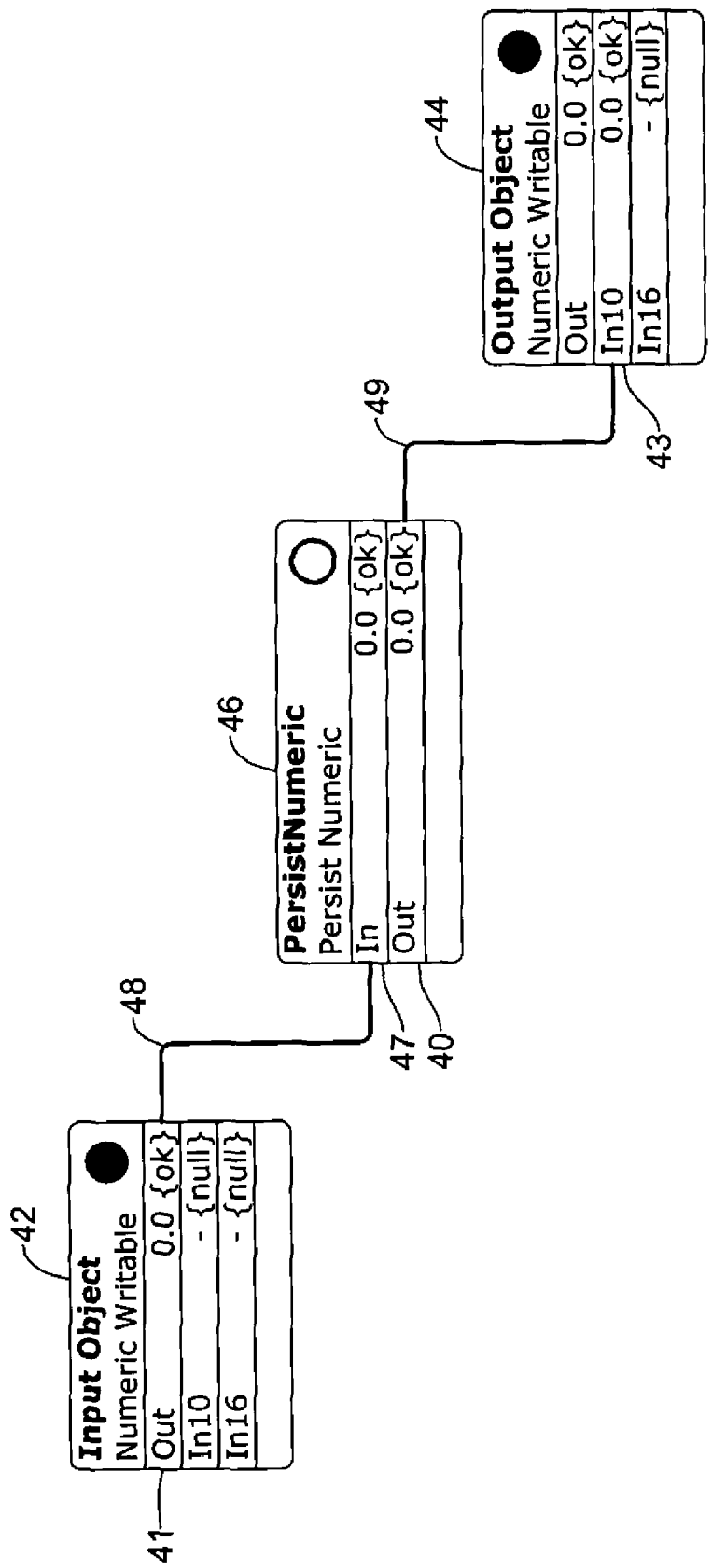
FIG. 5 is a diagram of a control sequence relative to an input object, a persist object and an output object.

FIG. 5 is a diagram showing a simple control sequence using NiagaraAX with the invention. Data comes from "Out"

slot 41 in Input Object 42 to "In" slot 47 of Persist Numeric 46 via line 48, and then from "Out" slot 40 of Persist Numeric 46 to "In 10" slot 43 of Output Object 44 via line 49. Upon a first invocation of "changed ( )" callback, Persist Numeric 46 will ignore the value of "In" slot 47 and instead load a value from its persistence file in the JACE's file system. The Persist Numeric 46 will then set the value of its "Out" slot 48 to that value effectively restoring the persisted value. This value is then passed to the downstream component Output Object 44. Upon subsequent invocations of the "changed ( )" callback, Persist Numeric 46 will store the "In" slot 47 value to its persistence file and pass the value on to the Output Object 44 effectively accomplishing an immediate save of Input Object's value when it changes.

Figure 6:
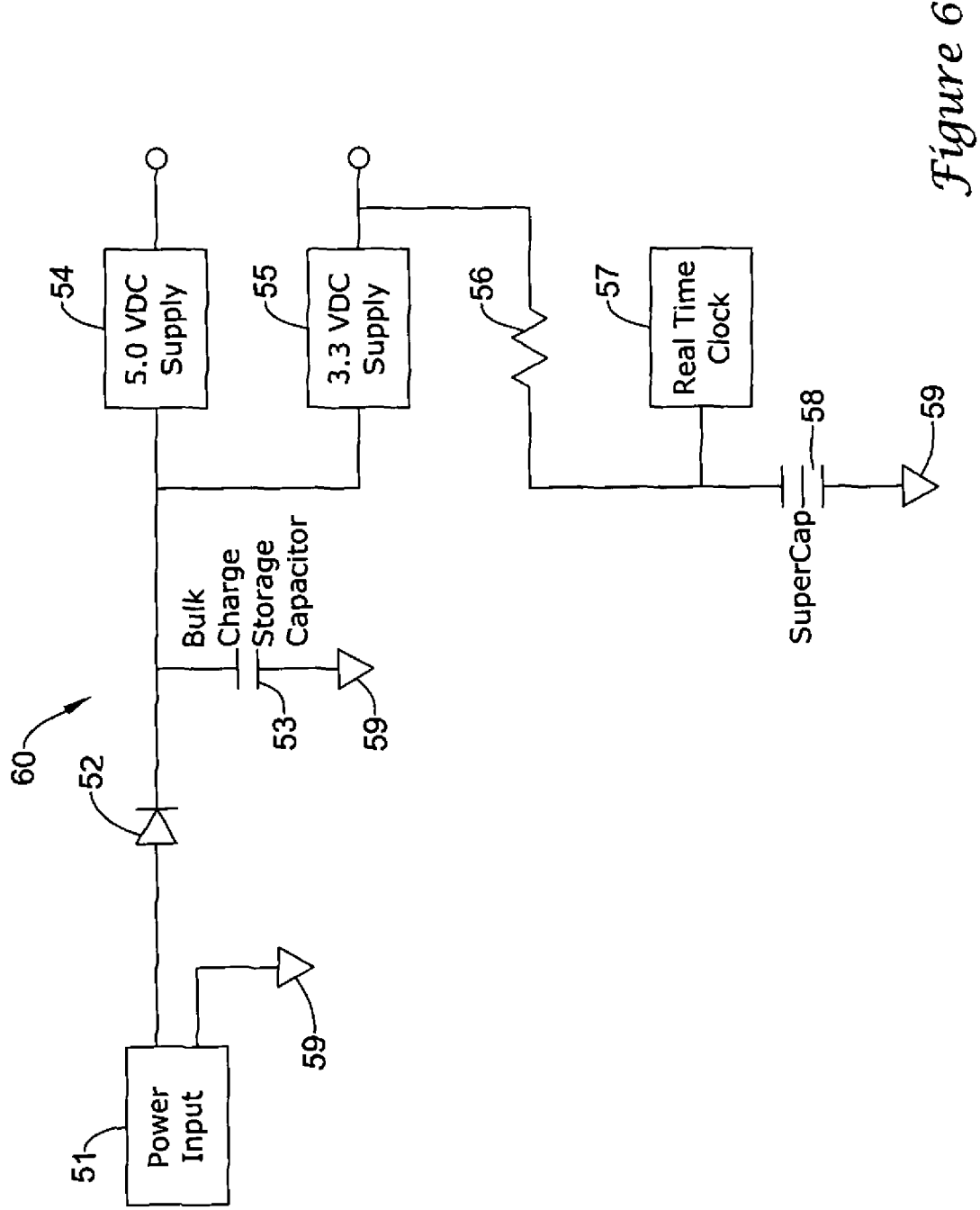
FIG. 6 is a diagram of a backup power system without a battery pack.

FIG. 6 is a diagram of the present reduced power supply 60, relative to the regular backup power supply 70 (FIG. 7), for the JACE computing platform as used with the present shutdown system. It may be a battery-less charge source having a traditional filter capacitor storage of electrical energy for enabling operation of the computing platform after a loss of power to the computing platform for a period of time sufficient for a persist object to persist a value of a control object.

Supply 60 may have a power input structure 51 with one terminal connected to a ground or reference voltage 59, and another terminal connected to an anode of a diode 52. It may be noted that when the power at input 51 fails, there appears very little power from supply 60 to back up the system connected to the supplies 54 and 55, in comparison to that of supply 70.

In supply 60, the cathode of diode 52, which effectively is a rectifier of the input power 51, may be connected to a bulk charge storage capacitor 53, and to the 5.0 VDC and 3.3 VDC supplies 54 and 55, respectively. An output of the 3.3 VDC supply may be connected to a resistor 56 which in turn is connected to a super capacitor 58 and a real time clock 57. The present system is designed so that the JACE computing platform can shut down properly with this reduced power supply upon a loss of power at input 51.

Figure 7:
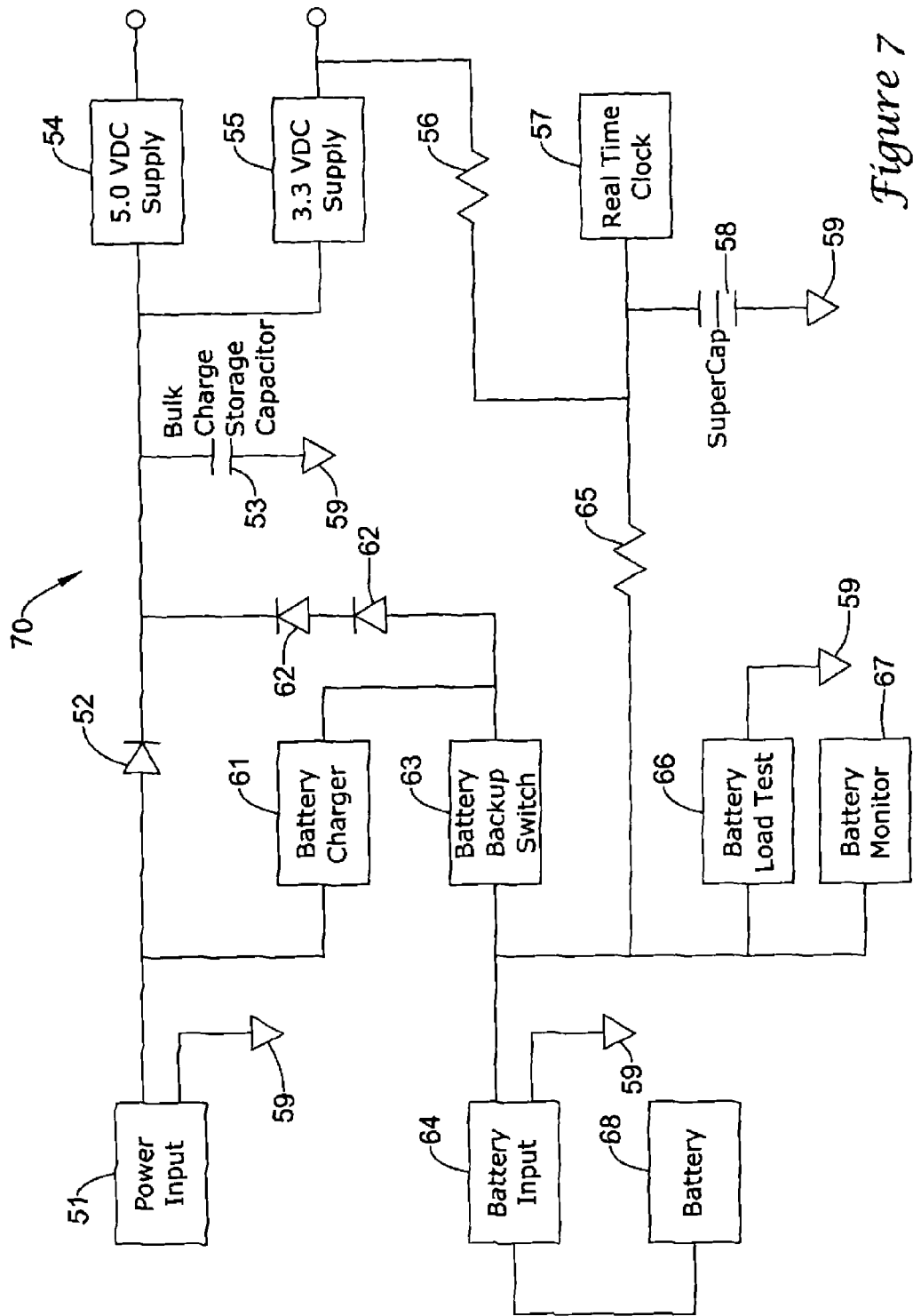
FIG. 7 is a diagram of a power system with a backup battery pack.

FIG. 7 is a diagram of power supply 70 requiring a battery input 64 connected to a battery 68 for sustaining a proper shut-down of the JACE computing platform by the regular JACE shut-down system upon a loss of power at power input structure 51. Other components of power supply 70 may include a battery charger 61 connected to the power input 51 and to the battery input 64 via a battery backup switch 63. Backup power from battery input 64 may go power supplies 54 and 55 via the battery backup switch 63 and steering diode(s) 62 connected series. Battery input 64 may connected to a battery load test component 66 and a battery monitor 67. The battery input 64 may also be connected to the circuit shown in FIG. 6 including resistor 56, real time clock 57 and super capacitor 58, via a series-connected resistor 65.

The present shut-down system makes it possible to eliminate the components 61-68 of the circuit shown in FIG. 7 and still provide a proper shut-down of the JACE computing platform upon an unexpected power loss at input 51, such that the platform can be brought up to normal operating condition without problems upon a return of power.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for rapidly saving value of an object in case of a loss of power to a Java™ application control engine (JACE) computing platform, comprising:
   a) powering up a JACE computing platform;
   b) starting NiagaraAX™ framework;
   c) opening a BAJA object graph (BOG) file;
   d) getting a BOG entry;
   e) creating a NiagaraAX™ object in a storage device from the BOG entry;
   f) setting an initial value of the object from the entry;
   g) invoking a "changed ( )" callback to indicate that the initial value of the object is set;
   h) repeating steps c) through g) for other BOG entries until getting another BOG entry is not available or desired;
   i) invoking the "changed ( )" callback for at least some of the objects during the execution of the JACE computing platform, wherein invoking the "changed ( )" callback, comprises:
   determining whether the changed operation is a first one for the object; and
   if the "changed ( )" callback is not a first one on the object, then save an "in" slot value to the storage device of the object, and set an "out" slot value to the "in" value; and
   j) saving the "in" slot value of at least one of the objects to the storage device upon the loss of power.

2. The method of claim 1 wherein the step h) invoking a "changed ( )" callback further comprises:
   if the "changed ( )" callback is a first one on the object, then determine whether a file of the object exists; and
   if a file of the object exists, the read a value from the file and set an "out" slot value to this value.

3. The method of claim 2, wherein the step f) invoking a "changed ( )" call back further comprises:
   if a file of the object does not exist, then create a file of the object, save an "in" value to the file;
   read the "in" value from file; and
   set an "out" slot value to the "in" value from the file.

4. The method of claim 3, further comprising:
   determining whether there is a power failure; and
   wherein:
   if a power failure is detected, then supplemental power is provided for a sufficient time to capture the runtime values; and
   the sufficient time is at least equivalent to an amount of time to save the at least one of the objects to the storage device.

5. The method of claim 4, wherein the supplement power is provided by capacitive storage.

6. The method of claim 5, wherein upon return of power to the JACE computing platform, runtime values of control objects and operational settings and/or parameters of the control objects from persistence files are retrieved from the storage device and restored the control objects.

\* \* \* \* \*